No. 742,091. PATENTED OCT. 20, 1903.
F. E. BLAISDELL.
WIPER FOR ENGRAVED PLATES.
APPLICATION FILED MAY 4, 1903.
NO MODEL.
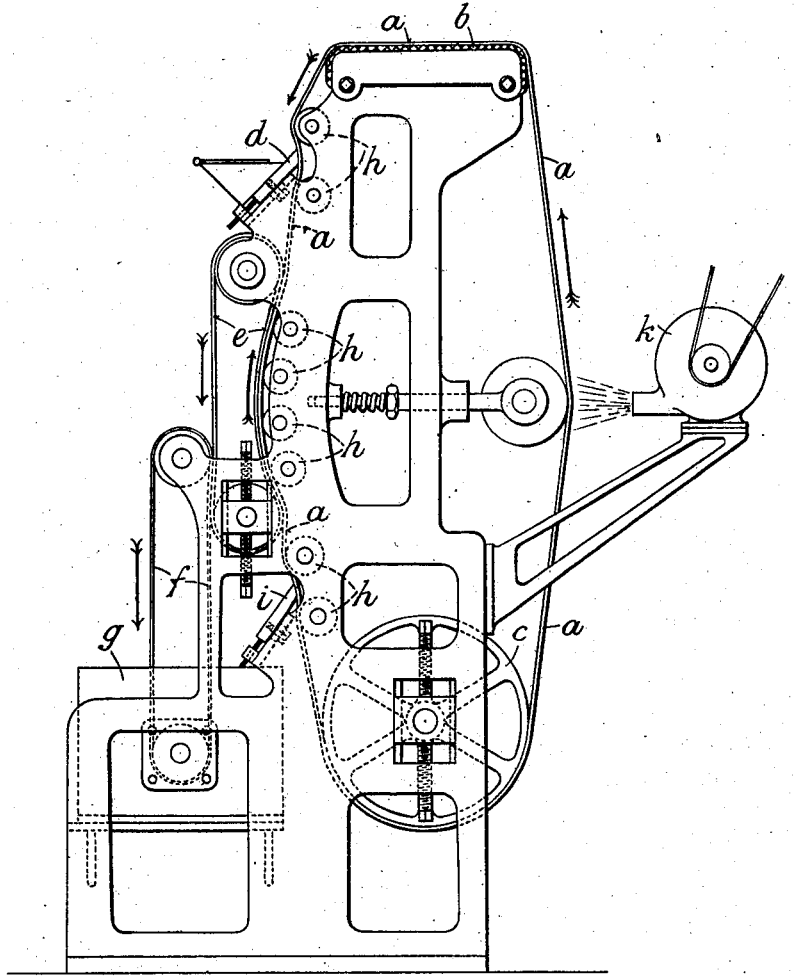
Witnesses:
Inventor
Frederick E. Blaisdell
By
James L. Norris
Atty.

No. 742,091. Patented October 20, 1903.

UNITED STATES PATENT OFFICE.

FREDERICK E. BLAISDELL, OF LONDON, ENGLAND.

WIPER FOR ENGRAVED PLATES.

SPECIFICATION forming part of Letters Patent No. 742,091, dated October 20, 1903.

Application filed May 4, 1903. Serial No. 155,667. (No model.)

*To all whom it may concern:*

Be it known that I, FREDERICK ELIJAH BLAISDELL, a citizen of the United States of America, residing at London, England, have invented a certain new and useful Wiper for Engraved Plates, of which the following is a specification.

This invention relates to a means for recovering the superfluous ink or color from the surfaces of engraved plates when printing therefrom.

My said invention comprises the use of a wiper made of a material which is impervious to the inks or colors used in printing and to the solvents of such inks or colors and means for cleaning the surface of such wiper, so that it can be used repeatedly. The wiper I employ may be one that is naturally impervious to the inks or colors and solvents aforesaid, or it may be one that is made impervious by suitable treatment. As an example of the former class of wiper I may mention one made from the mucous membrane of animals, and as an instance of the latter class I may mention a wiper made from a more or less absorbent fabric or other flexible material soaked or coated with shellac or other substance which is impervious to printing inks or colors and their solvents.

For the purposes of my invention the wiper may be made into an endless band, or it may be wound on reels or rollers and unwound from one reel or roller and wound up on the other reel or roller as it is used for wiping purposes. After the wiper has traversed the engraved plate and removed the superfluous ink therefrom it is treated with scrapers and solvents, and, if necessary, also with brushes, belts, rubbers, or the like, and in some instances with air-jets to thoroughly clean and dry the surface thereof ready for further use. The greater portion of the ink is recovered by this method and the wiper is rendered quite clean and fit for repeated use.

In the accompanying drawing I have indicated diagrammatically how my said invention can be carried into practice.

In the drawing, $a$ indicates the wiper, in the form of an endless band of impervious material possessing sufficient strength and durability to resist hard wear. In the example shown the engraved plate to be wiped passes over that portion of the wiper supported by the pad $b$. In some cases the impervious wiper is used in the form of a strip unwound from one drum and wound up on another. After being used for wiping the surface of an engraved plate or die the said wiper is moved to bring a fresh portion thereof into the operative position—for example, by means of a driving-pulley $c$, around which the wiper passes and which is actuated intermittently for that purpose in any suitable manner. By such movement a portion of the wiper which has previously become coated with superfluous ink or color removed from the engraved plate or die is drawn past an adjustable scraper $d$, by which thick deposits, if any, of the ink or color are removed and recovered, leaving only a thin film thereof upon the wiper. This soiled part of the wiper is subsequently brought in contact with cleaning means—for example, a traveling endless belt $e$, made of plush or other brush-like material, by which a suitable solvent is applied thereto to dissolve or loosen the remaining ink or color thereon, such dissolved ink or color being carried off by the belt. Said belt $e$ is driven by suitable means, and in the preferred construction moves in contact with a similar traveling endless belt $f$, which dips into a tank $g$, containing the solvent. The belt $f$ feeds the belt $e$ with the solvent and also keeps the latter clean by carrying away the dissolved ink or color from its surface. The direction of movement of the belts $e$ and $f$ is indicated by the arrows. A second adjustable scraper $i$, arranged below the belt $e$, removes any surplus moisture and leaves the wiper quite clean and ready for further use. The wiper is kept in close contact with the scrapers $d$ $i$ and with the belt $e$ by means of rollers $h$. In some cases a jet of air is finally blown on the wiper by means of a blower $k$ to dry it.

The solvent in the tank $g$ is used over and over again and is changed when it becomes too dirty for further use.

What I claim is—

1. The combination of a movable impervious ink-wiping band, a scraper adapted to engage said band for removing the ink therefrom, means engaging said band for supplying an ink solvent thereto, means engaging said solvent-supplying means for feeding a solvent thereto, said feeding means communicating with a solvent-supply, and an additional scraper for removing the surplus moisture from the band after its contact with the means for supplying the solvent thereto.

2. The combination of a movable impervious ink-wiping band, a scraper adapted to engage said band for removing the ink therefrom, means engaging said band for supplying an ink solvent thereto, means engaging said solvent-supplying means for feeding a solvent thereto, said feeding means communicating with a solvent-supply, an additional scraper for removing the surplus moisture from the band after its contact with the means for supplying the solvent thereto, and means for blowing jets of air against that portion of the band that has passed the additional scraper for drying it.

In testimony whereof I have hereunto set my hand in presence of two subscribing witnesses.

F. E. BLAISDELL.

Witnesses:
GEORGE HARRISON,
HERBERT A. BEERTON.